July 9, 1963

E. J. KENNEY 3,096,587

SKETCHING DEVICE

Filed Aug. 3, 1960

INVENTOR.
EMIL J. KENNEY
BY
WATTS, EDGERTON, PYLE & FISHER
B. D. Watts
ATTORNEYS July 9, 1963
E. J. KENNEY
3,096,587
SKETCHING DEVICE
Filed Aug. 3, 1960
2 Sheets-Sheet 2
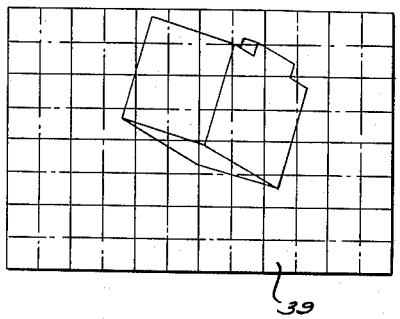
Fig. 3
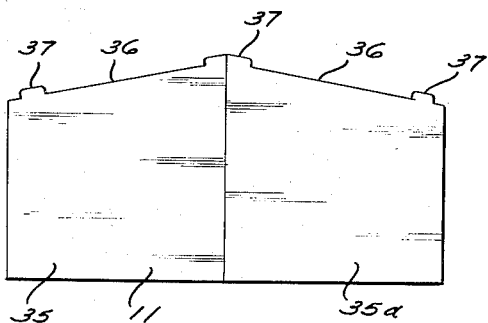
Fig. 5
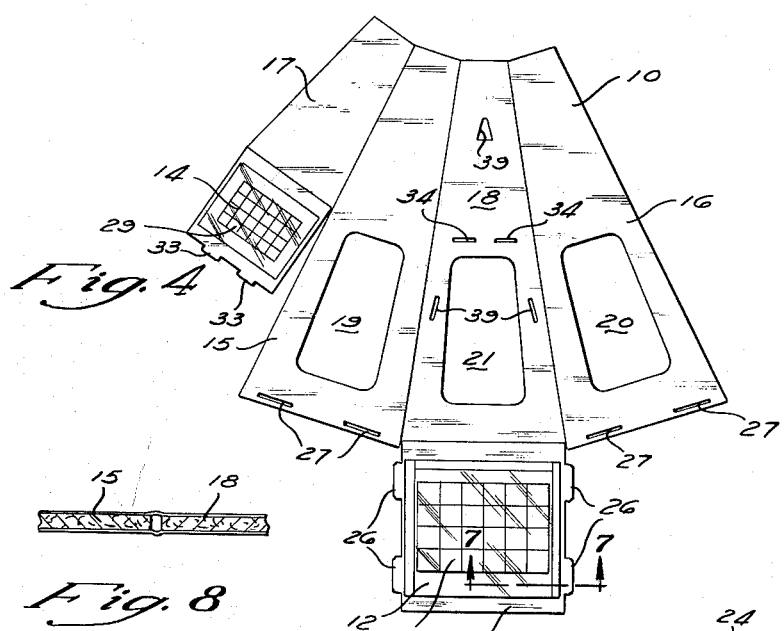
Fig. 4
Fig. 8
Fig. 7
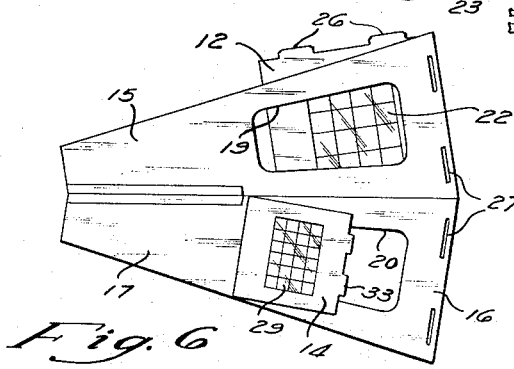
Fig. 6
INVENTOR.
EMIL J. KENNEY
BY
WATTS, EDGERTON, PYLE & FISHER
B. D. Watts
ATTORNEYS

United States Patent Office 3,096,587
Patented July 9, 1963

3,096,587
SKETCHING DEVICE
Emil J. Kenney, Middleburg Heights, Ohio, assignor to The Craftint Manufacturing Company, Cleveland, Ohio, a corporation of Ohio
Filed Aug. 3, 1960, Ser. No. 47,264
6 Claims. (Cl. 33—64)

The present invention relates to improvements in viewing devices for sketching or the drawing of objects and/or selected scenic views.

A principal object of the invention is to provide a sketch viewing device that will enable the artist or other user to sketch or draw such selected objects or selected views so that the completed sketches or drawings will be in proper perspective with respect to their relative distance and importance as they appear to the eye of the viewer.

Another object of the invention is to provide a sketch viewing device having a rectangular transparent grid forming the base of a rectangular truncated pyramidal viewing frame, and a second rectangular transparent grid disposed within said frame parallel to and spaced apart from said base grid. The said second grid having grid markings in substantial alignment with planes passing through the vertex of said truncated pyramidal frame and the markings on said base grid.

Another object to the invention is to provide a sketch viewing device having a foldable truncated rectangular pyramidal viewing frame with its two side walls of substantially equal size and shape, and its top and bottom walls somewhat wider at the base than the said side walls, and the said bottom wall having a transparent grid hingedly connected to the base thereof, and the said top wall having a portion thereof removed adjacent the base to provide a hinged connection with the said second transparent grid that is disposed within said frame, parallel to and spaced apart from said base grid upon the assembly of said viewing frame.

Another object of the invention is to provide a detachable viewing frame support for said device.

Another object of the invention is to provide a sketching device in which all but one of the adjacent walls of the truncated rectangular pyramidal viewing frame are hingedly connected, thus permitting the frame to be assembled from the flat or plane surface.

Another object of the invention is to provide a transparent view position finder grid slideable on said transparent base grid.

It is still another object of the invention to provide a sketching device that may be folded in compact form for carrying to and from location or stored when not in use.

Other objects and advantages of the invention reside in a structure that is inexpensive to manufacture, has a minimum number of parts that are easy to assemble, and is efficient in operation.

Other objects and advantages more or less ancillary to the foregoing will appear in the following description, which considered in connection with the accompanying drawings, sets forth the preferred embodiment of the invention.

Referring to the drawings:

FIG. 3 is a plan view of the ruled sketching paper;

FIG. 4 is a plan view of the unfolded truncated rectangular pyramidal frame with the transparent base grid hingedly connected to the base of the bottom wall thereof, and the second intermediate transparent grid hingedly connected to the base of the top wall thereof;

FIG. 5 is a front elevation view of the support for the viewing frame;

FIG. 6 is a plan view of the viewing frame folded for carrying or storing while not in use;

FIG. 7 is a fragmentary sectional view of the base grid taken on a line 7—7 of FIG. 4;

FIG. 8 is a fragmentary sectional view of two adjoining viewing frame walls showing the hinge connecting said walls.

Figure 1:
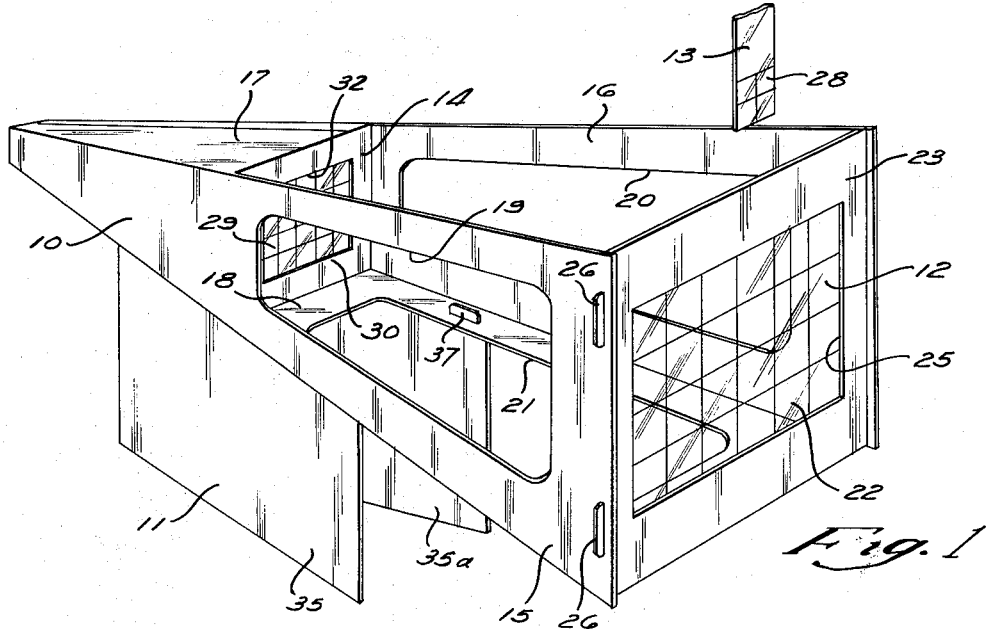
FIG. 1 is a view in perspective of the assembled improved sketching device with a view position finder grid shown detached therefrom.

Referring particularly to the drawings, the improved sketch viewing device may preferably be made of cardboard covered with cloth or paper that is pasted or glued thereon except for the transparent grid parts which may preferably be made of transparent plastic such as the commercially known Plexiglas or the like.

The device consists of five principal parts, i.e. the foldable viewing frame 10, the detachable support 11 therefor, the base grid assembly 12, the view position finder 13, and the intermediate aligning grid assembly 14.

Figure 2:
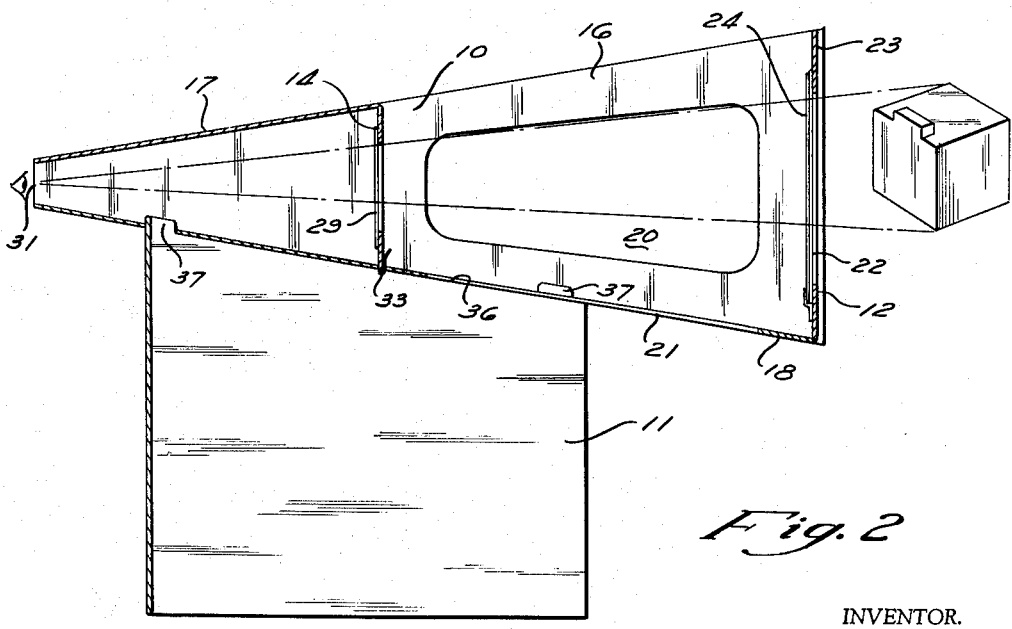
FIG. 2 is a vertical sectional view of said assembled sketching device with an object in linear perspective projection.

Referring to FIGS. 1, 2 and 4, it will be seen that the viewing frame 10 is a rectangular truncated pyramid in form with the side walls 15 and 16 equal in size and shape. The top wall 17 and the bottom wall 18 are somewhat wider than the side walls 15 and 16 as they extend toward their respective bases, and the top wall 17 has a portion thereof removed adjacent its base. The two said side walls 15 and 16 have centrally aligned apertures or openings 19 and 20 respectively, located between their respective bases and the base of the said top wall 17. The said bottom wall 18 has an aperture or opening 21 of similar shape and location as the said side wall apertures 19 and 20.

The base grid assembly 12 comprises a rectangular transparent clear plastic grid sheet 22, a rectangular grid frame 23, and a rectangular transparent clear plastic backing sheet 24. The said base grid assembly 12 is hingedly connected to the base of the said bottom wall 18 of said viewing frame 10.

The said plastic grid sheet 22 is ruled with spaced vertical and horizontal lines on one face thereof to form squares of equal size. The vertical and horizontal columns formed thereby may be suitably identified by numbers and/or letters. The said lines are filled with opaque material, and contrasting colors may be used for alternate lines to serve as an aid in the identification of the position of the object being drawn.

The said grid frame 23 is preferably made of the same material as the said walls of the viewing frame 10 with its overall dimensions substantially the same size as the adjacent bases of the two side walls 15 and 16, and bottom wall 18 of the said viewing frame. The said grid frame 23 is provided with a large rectangular central opening 25 over which the said plastic grid sheet 22 is placed and affixed so that the grid lines thereof are parallel to the respective edges of the grid frame 23. The said grid frame 23 is also provided with ears 26 extending from the edges thereof adjacent to the side walls 15 and 16 of the viewing frame 10, and upon assembly of the said viewing frame 10 are inserted into complementary aligned slots 27 in the said sidewalls 15 and 16 on a line adjacent to and parallel with their respective base edges.

The said plastic backing sheet 24 is substantially the size of the said plastic grid sheet 22 and is placed upon the said plastic grid sheet 22 so that it covers a surface thereof. The said grid sheet 22 and the said backing sheet 24 are glued or otherwise secured together along the edges thereof that are contiguous to the bases of the said side walls 15 and 16 and the base of the bottom wall 18 of the viewing frame 10.

The said view finder 13 is a rectangular clear transparent plastic sheet having a width approximately the width of one of the columns of the base grid 22, and a length exceeding the distance from the bottom row of grid squares of said base grid 22 to the top of the said base grid frame 23. The said view finder 13 has a grid square 28 adjacent one end thereof that is identical in size to one of the said squares of the said base grid 22. The said finder square 28 may preferably be subdivided into four equal squares as a further aid for a more exact finding of key points of the object being viewed.

The grid square end 28 of the view finder 13 is slideably inserted between the said base plastic grid 22 and the said backing sheet 24 from the edges thereof adjacent the top side of said grid frame 23.

The intermediate aligning grid assembly 14 is hingedly connected to the base of the said top wall 17 of the viewing frame 10, and comprises a rectangular transparent clear plastic grid sheet 29 and a rectangular grid frame 30.

The said plastic grid sheet 29 is ruled with spaced vertical and horizontal lines on one face thereof forming an equal number of squares as the squares shown on the said base grid 22. The said lines forming the grid markings thereon are in substantial alignment in planes passing through the vertex 31 of said assembled viewing frame 10 and the corresponding lines forming the grid markings on the said base grid 22.

The said intermediate grid frame 30 is preferably made of the same material as the base grid frame 23. It is the approximate length of the adjacent base of the top wall 17 and its width is the same as the width of the side wall 15 at the base of the top wall 17. The said grid frame 30 is provided with a large rectangular central opening 32 over which the said plastic grid sheet 29 is placed and affixed. The said grid frame 30 is also provided with ears 33 extending from the edge thereof adjacent to the said bottom wall 18 of the viewing frame 10 for insertion into complementary aligned slots 34 at a point so that the said intermediate grid frame 30 will be parallel to the base grid frame 23 upon the assembly of said viewing frame 10.

The detachable support 11 is preferably made of the same material as the viewing frame 10. As shown in FIGS. 1 and 5 the said support 11 has two wings 35 and 35a hingedly joined along one vertical edge thereof. The bottom edges and adjacent vertical edges thereof form right angles. The top edges 36 thereof are inclined so that when the said support 11 is attached to the assembled viewing frame 10, the central axis of the viewing frame 10 will lie in a plane that is substantially parallel to the said bottom edges of said support wings 35 and 35a. The said top edges 36 have spaced ears 37 extending therefrom which are inserted into complementary slots 38 in the said bottom wall 18 of the viewing frame 10.

The sketch paper 39 is preferably ruled with a like number of squares that are found on the base grid plastic sheet 22 and if desired may be identified with similar letters or numerals as those that may be used on said base grid plastic sheet 22.

The viewing frame 10 is assembled for use from a flat or horizontal position as shown in FIG. 4. First, the base grid assembly 12 is moved to a vertical position. Second, the side walls 15 and 16 are moved to a vertical position with the said ears 26 of the grid frame 23 inserted into the slots 27 of the said side walls 15 and 16. Third, the said top wall 17 with the attached intermediate grid assembly 14 is moved into place above the said bottom wall 18. As the top wall 17 approaches its said place the intermediate grid assembly 14 is lowered between the said side walls 15 and 16 to a vertical position with the ears 33 thereof inserted into the said slots 34.

The said viewing frame 10 is then mounted upon the said support 11 by placing said support 11 centrally beneath said bottom wall 18 in a vertical position with the hinge thereof toward the vertex 31 and the said wings 35 and 35a opened to form a V so that the said ears 37 thereon can be inserted into the said slots 38 in the bottom wall 18 of the said viewing frame 10.

The user may then direct the said viewing frame toward the object to be drawn as is shown in FIG. 2. For best results the eye of the user is placed at the vertex 31 so that the squares of the grids 12 and 14 are in alignment. The finder 13 may then be moved into and aligned with the square of the base grid where the user desires to start the drawing.

It will be seen that the user may observe the object within the bounds of the said finder square when it is placed upon the desired square of the base grid sheet and then reproduce such localized portion of the object on a like square of the sketch paper 39. The observation may be repeated without a distortion of the object so viewed, simply by placing the user's eye position so that like squares on the base grid sheet and the intermediate grid sheet are in proper alignment.

When the drawing of such localized portion of the object is completed the drawing may be resumed by positioning the said finder 13 over an adjoining square of said base grid sheet for the reproduction of the object on a like square of the sketch paper 39.

When the user has completed the sketch, or has completed the sitting, the improved sketching device may be disassembled and folded for carrying or storing as shown in FIG. 6 of the drawings.

Although the foregoing description is necessarily of a detailed character, in order that the invention may be completely set forth, it is understood that the specific terminology is not intended to be restrictive or confining, and that various rearrangements of parts and modifications of detail may be resorted to without departing from the scope or spirit of the invention as herein claimed.

What is claimed is:

1. A sketching device comprising a rectangular truncated pyramidal viewing frame, a transparent rectangular base grid therefor, a transparent finder grid slideably mounted on said base grid, a transparent rectangular aligning grid interposed in said viewing frame between said base grid and the vertex of said truncated pyramidal viewing frame, and a positioning support for said viewing frame.

2. A sketching device comprising a rectangular truncated pyramidal viewing frame, a transparent rectangular base grid therefor having a base grid frame hingedly joined to the base of the bottom wall of said viewing frame, spaced ears extending from the edge of said base grid frame adjacent the side walls of said viewing frame for insertion into complementary aligned slots in said side walls adjacent the bases thereof, a transparent grid sheet mounted on said base grid frame having vertical and horizontal lines forming equal squares on one face thereof, and a transparent backing sheet overlying said grid sheet and affixed thereto along the edges thereof, adjacent the bottom and side walls of said viewing frame, a transparent rectangular finder grid, slideably mounted between said grid sheet and backing sheet, a transparent rectangular aligning grid disposed in said viewing frame intermediate said base grid and the vertex of said truncated pyramidal viewing frame, and a positioning support for said viewing frame.

3. A sketching device comprising a rectangular truncated pyramidal viewing frame, a transparent rectangular base grid therefor having a base grid frame hingedly joined to the base of the bottom wall of said viewing frame, spaced ears extending from the edge of said base grid frame adjacent the bases of the side walls of said viewing frame for insertion into complementary aligned slots in said side walls adjacent the bases thereof, a transparent grid sheet mounted on said base grid frame having vertical and horizontal lines forming equal squares on said face thereof and a transparent backing sheet overlying said grid sheet and affixed thereto along the edges thereof adjacent the bottom and side walls of said viewing frame, a transparent rectangular finder grid, slideably mounted between said grid sheet and backing sheet, a transparent rectangular aligning grid disposed in said viewing frame intermediate said base grid and the vertex of said truncated pyramidal viewing frame, the said aligning grid having a grid frame hingedly joined to the base of the top wall of said viewing frame, spaced ears extending from the edges of said aligning grid frame adjacent the bottom wall of said viewing frame for insertion into complementary aligned slots in the bottom wall of said viewing frame so that the said grid frame will be parallel to the said base grid frame upon the assembly of said viewing frame, a transparent grid sheet mounted on said grid frame having vertical and horizontal lines forming equal squares on one face thereof with the said squares in substantial alignment of planes passing through the vertex of said viewing frame and corresponding lines forming the grid markings on the said base grid, and a detachable positioning support for said viewing frame.

4. A sketching device comprising a foldable rectangular truncated pyramidal viewing frame having its opposite walls substantially equal in size, the top wall of said viewing frame having a portion thereof adjacent its base removed; the contiguous edges of said walls being hingedly joined along three of the four converging corners of said viewing frame, a transparent rectangular base grid therefor, a transparent finder grid slideably mounted on said base grid, a transparent rectangular aligning grid interposed in said viewing frame between said base grid and the vertex of said truncated pyramidal viewing frame, and a detachable positioning support for said viewing frame.

5. A sketching device comprising a foldable rectangular truncated pyramidal viewing frame having its opposite walls substantially equal in size, the top wall of said viewing frame having a portion thereof adjacent its base removed, the contiguous edges of said walls being hingedly joined along three of the four converging corners of said viewing frame, a transparent rectangular base grid therefor having a base grid frame hingedly joined to the base of the bottom wall of said viewing frame, spaced ears extending from the edge of said base grid frame adjacent the side walls of said viewing frame for insertion into complementary aligned slots in said side walls adjacent the bases thereof, a transparent grid sheet mounted on said base grid frame having vertical and horizontal lines forming equal squares on one face thereof and a transparent backing sheet overlying said grid sheet and affixed thereto along the edges thereof adjacent the bottom and side walls of said viewing frame, a transparent rectangular finder grid, slideably mounted between said grid sheet and backing sheet, a transparent rectangular aligning grid disposed in said viewing frame intermediate said base grid and the vertex of said truncated pyramidal viewing frame, and a detachable positioning support for said viewing frame.

6. A sketching device comprising a foldable rectangular truncated pyramidal viewing frame having its opposite walls substantially equal in size, the top wall of said viewing frame having a portion thereof adjacent its base removed, the contiguous edges of said walls being hingedly joined along three of the four converging corners of said viewing frame, the said side walls and bottom wall have centrally aligned apertures therein between their respective bases and the base of the top wall thereof, a transparent rectangular base grid therefor having a base grid frame hingedly joined to the base of the bottom wall of said viewing frame, spaced ears extending from the edge of said base grid frame adjacent the bases of the side walls of said viewing frame for insertion into complementary aligned slots in said side walls adjacent the bases thereof, a transparent grid sheet mounted on said base grid having vertical and horizontal lines forming equal squares on one face thereof and a transparent backing sheet overlying said grid sheet and affixed thereto along the edges thereof adjacent the bottom and side walls of said viewing frame, a transparent rectangular finder grid, slideably mounted between said grid sheet and backing sheet, a transparent rectangular aligning grid disposed in said viewing frame intermediate said base grid and the vertex of said truncated pyramidal viewing frame having a grid frame hingedly joined to the base of the top wall of said viewing frame, spaced ears extending from the edges of said grid frame adjacent the bottom wall of said viewing frame for insertion into complementary aligned slots in the bottom wall of said viewing frame so that the said grid frame will be parallel to the said base grid frame upon the assembly of said viewing frame, a transparent grid sheet mounted on said grid frame having vertical and horizontal lines forming equal squares on one face thereof with the squares in substantial alignment of planes passing through the vertex of said viewing frame and corresponding lines forming the grid markings on the said base grid, and a detachable positioning support for said viewing frame having two wings hingedly joined along one vertical edge and spaced ears extending from the top edges thereof for insertion into complementary slots in the bottom wall of said viewing frame.

References Cited in the file of this patent

UNITED STATES PATENTS

| 863,407 | Lancaster | Aug. 13, 1907 |
| 1,992,083 | McDonald | Feb. 19, 1935 |

FOREIGN PATENTS

| 20,691 | Australia | Nov. 12, 1929 |